United States Patent [19]

Heikinheimo

[11] 4,325,477

[45] Apr. 20, 1982

[54] APPARATUS FOR THE FEEDING OF INDIVIDUAL PIECES OF TIMBER FROM A MAT OF A PLURALITY OF TIMBER PIECES

[75] Inventor: Lennart O. Heikinheimo, Helsinki, Finland

[73] Assignee: Plan-Sell Oy, Finland

[21] Appl. No.: 865,201

[22] Filed: Dec. 28, 1977

[30] Foreign Application Priority Data

Jan. 13, 1977 [FI] Finland .................................. 770095

[51] Int. Cl.³ .............................................. B65G 47/31
[52] U.S. Cl. ..................................... 198/461; 198/491
[58] Field of Search ............... 198/461, 462, 688, 459, 198/476, 491, 492, 474

[56] References Cited

U.S. PATENT DOCUMENTS 3,989,135 11/1976 Pyykonen ............................ 198/461

FOREIGN PATENT DOCUMENTS 508227 6/1939 United Kingdom ................. 198/462

Primary Examiner—Robert B. Reeves
Assistant Examiner—Douglas D. Watts
Attorney, Agent, or Firm—McGlew and Tuttle

[57] ABSTRACT

An apparatus for feeding individual pieces of timber from a mat of a plurality of interconnected or closely adjacent timber pieces, comprises a feed conveyor for feeding the timber mat through a feed path which, for example, may comprise an inclined plane along which the timber mat moves by gravity. A cam or arm member is oscillated periodically to engage in front of the foremost edge of the foremost piece of the timber mat in order to position it at a location in which it will be engaged by a respective projection member which forms a part of an endless conveyor having a plurality of such projection members which are advantageously formed by pivoting them together. The projection members are shaped in a triangular fashion so that the apex of the triangular part engages directly adjacent the trailing edge of the foremost piece of lumber which is fed along the feed path and it aids in separating this piece from the remaining pieces. In addition, the projection member includes a support surface which is inclined downwardly in the direction of movement of the transfer conveyor and the supporting surface moves below each timber piece in succession and supports it in a downwardly and forwardly inclined position as it is transferred away from the feed conveyor. The transfer conveyor moves through a path such that the foremost edge of each picked-up lumber piece is deposited on a second conveyor which also may be of an endless belt type which travels through a path intersecting the transfer conveyor.

5 Claims, 1 Drawing Figure

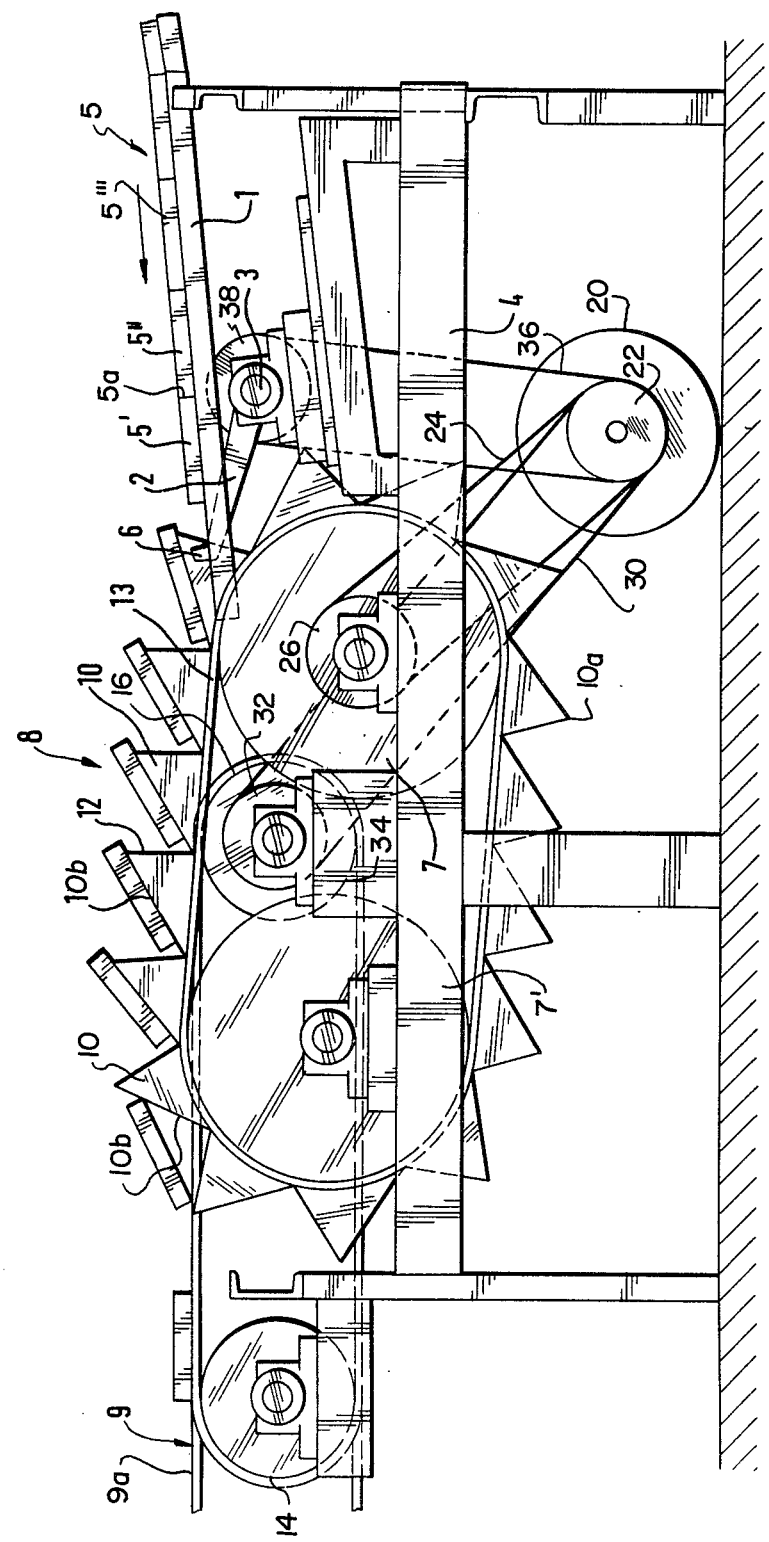

APPARATUS FOR THE FEEDING OF INDIVIDUAL PIECES OF TIMBER FROM A MAT OF A PLURALITY OF TIMBER PIECES

FIELD AND BACKGROUND OF THE INVENTION

This invention relates in general to timber handling devices and, in particular, to a new and useful apparatus for the single feeding of timber, comprising a feeding conveyor for transferring a layered mat of timber to a measuring spot, at which there is a timber stopping device which can be moved out of the way of the timber mat, and an endless belt for transferring individual pieces of the timber from the mat with regular spacing therebetween to a second conveyor and including members projecting from the endless belt for lifting of the foremost piece of timber onto the feeding conveyor and transferring it to the second conveyor.

DESCRIPTION OF THE PRIOR ART

Previously known devices for separating and feeding cut timber have the drawback that the pieces of timber have a tendency to glide off of the transferring members fitted on the endless conveyor. The aim has been to eliminate this drawback by roughening the upper surface of the transferring members or by arranging spikes on the upper surface of the transferring members to prevent the timber pieces from gliding. The roughness of the spikes can, however, impede their unfastening and their transfer to the feeding conveyor, as well as damaging the timber pieces. In all cases, the gliding of the timber pieces off of the transferring members of the endless conveyor is an important factor restricting the capacity of such feeding devices.

Single feeding devices are also known which have a stationary stop at the end of the feeding conveyor, and in which the transferring members on the endless belt are arranged to rise vertically from the feeding belt, with the piece of timber naturally being pressed tightly against the upper surface of the transferring member without tending to glide off and, at the end of the transferring stage, the transferring members are turned essentially according to the course of the endless belt. To prevent the foremost piece of timber when being lifted from also lifting the following piece of the timber pressed tightly against it, there is a stopper above the feeding belt which pushes the second piece of timber against the feeding belt and prevents it from being lifted with the foremost piece of timber.

A single feeding device of this kind is relatively complicated and expensive due to the necessary control devices required for adjusting the position of the transferring members during their motion forward, and the necessity of a stopper for preventing the second piece of timber from being lifted with the foremost piece. If the longitudinal edges of the timber pieces are bevelled, there is a risk that the front edge of the second piece of timber will rise on top of the one ahead of it and prevent it from being lifted, and then the transferring member, which rises from the feeding conveyor, only wrenches the foremost piece of timber on top of the second piece.

Another device of the above-mentioned type is also known, which has a stop at the end of the feeding conveyor which can be lowered in synchronization with the transferring members to allow the mat of timber to move forward on the feeding conveyor with the foremost piece of timber then being unfastened from the following piece of timber, so that it can be lifted without interference from the feeding conveyor without having to hold down the second piece of timber.

All of the above-mentioned devices have the drawback that the distances between the transferring members are relatively large, and at best, they are at least the same as the width of the biggest board to be fed, which leaves the capacity of the single feeding apparatus low, or otherwise, the transferring members will have to move at such a speed that the remaining timber pieces are endangered.

SUMMARY OF THE INVENTION

The present invention provides a simple and inexpensive, but still reliably functioning device, for single feeding of timber. According to the invention, the timber pieces are moved forward on the transferring conveyor in an inclined postion with the projecting transferring members being directly pivoted onto each other, and thus, the spacing between them can be made considerably smaller than the width of the biggest piece of timber to be fed. Due to this, the speed of the transferring conveyor can be fixed lower than in the previously known devices with the same capacity, so that the timber pieces will, with greater certainty, remain on the bearing surfaces or edges, against which the pieces of the timber are also tightly pressed, when these edges are forward, slanting in the direction of the movement.

In addition, there is no need, in the device according to the invention, for controls for moving the transferring members projecting from the endless belt into different positions in regard to the endless belt, since the projecting members have, viewed in the direction of their movement, a surface slanting towards the endless belt ensuring that each timber piece is pressed tightly against its bearing surface. It has been observed that a piece of timber stays better on a transferring member with a bearing surface slanting forward than on a transferring member with a bearing surface essentially in the same plane as its route.

A preferred embodiment of the invention has transferring members with the back part of the transferring surface arranged first to rise from the feeding conveyor to ensure that the timber piece will immediately take a forward inclined position in which it is pressed tightly against its bearing base. At the same time, controls for the transferring members can be avoided, since the timber pieces can also be delivered to a second conveyor in an inclined position.

Accordingly, it is an object of the invention to provide an apparatus for transferring individual timber pieces from a mat of a plurality of interconnected or closely adjacent timber pieces which comprises a feed conveyor for feeding the mat to a location at which it is in the range of operation of a transfer conveyor which has projecting members thereon which have a projecting edge which engages the foremost lumber piece in the mat at the location of its trailing edge, facilitates the separation of the foremost piece from the mat and supports the foremost piece in a downwardly inclined position in respect to the forward movement of the transfer conveyor, so that it can be transferred to a second conveyor and deposited thereon.

Another object of the invention is to provide an apparatus for feeding individual pieces of timber from a mat of the timber which includes a transfer conveyor having means thereon for engaging the foremost one of the timber pieces facilitating its separation from the mat and transporting it in an inclined position on an endless conveyor so that the individual pieces of timber may be transferred on the endless conveyor in close prearranged obliquely held positions requiring less space than if they were held in a horizontal or flat position.

A further object of the invention is to provide an apparatus for feeding individual pieces of timber from a mat of timber which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic side elevational view of a device for transferring individual pieces of timber from a mat of timber, constructed in accordance with the invention.

DESCRIPTION OF THE PREFERRED EMBODIMENT

Referring to the drawing in particular, the invention embodied therein, comprises a device for feeding individual pieces of timber from a mat, generally designated 5, of a plurality of timber pieces which are interconnected or arranged closely adjacent so that they move, for example, by gravity, along a feeding conveyor 1. The timber pieces 5', 5'', 5''', etc., comprises, for example, timber pieces which have been cut in a sawmill but in which the through-cut does not extend completely through the pieces.

A second conveyor 9 which, for example, comprises an endless belt conveyor including a belt 9a guided over conveyor pulleys 14 and 16 is arranged at spaced location to the feeding conveyor 1.

In accordance with the invention, a transfer conveyor 8 is disposed between feeding conveyor 1 and the second conveyor 9 and, in the embodiment shown, it comprises an endless conveyor member or belt 13 made up of a plurality of projecting members 10 which, in the embodiment shown, are of triangular configuration and are either pivoted to the belt 13 or to each other so as to form the belt. A feature of the construction of the projections 10 is that they include a projection part of apex 10a of a triangular formation which engages a foremost piece of timber 5' at a location adjacent its trailing edge 5a. By so doing, it facilitates the separation of the foremost piece 5' from the next following piece 5''. In addition, the projection members 10 include a foremost edge or support surface 10b which moves beneath each foremost piece of the timber mat 5 and supports each lumber piece in a forwardly and downwardly inclined position as the conveyor belt 13 is moved from the feed conveyor to the second conveyor 9. For purposes of example, the conveyors are shown as being driven from a common motor 20 driving through one or more belt pulleys 22 and a belt 24 to a belt pulley 26 so as to drive a conveyor pulley 7 to move the conveyor belt 13. Conveyor belt 13 is also guided around a pulley 7' which is spaced in the direction of the conveyor 9 away from the conveyor pulley 7. Similarly, the conveyor 9 for example, may be driven by a belt 30 from the same pulley 22 or another pulley (not shown) which engages with a second conveyor pulley 32 to drive a second conveyor pulley 34. The second conveyor belt 9a is also trained to run around a guide pulley 14 as well as other pulleys (not shown).

In accordance with a further feature of the invention, the timber mat 5 which is fed along the feeding conveyor 1 is arrested temporarily by cam means including a stop member 6 carried at the end of an oscillatable arm which, for example, is shown as being driven by a belt 36 and a pulley 38 in timed relationship to the operation of the other conveyors. In any event, the arm 2 is oscillated so that its arrests the foremost timber piece at the end of the feeding conveyor 1 in a position such that it will be engaged by the projection 10a of each projection member in the vicinity of the trailing edge 5a, as mentioned previously. When this occurs, the stop 6 will be displaced downwardly by movement of arm 2 to release the foremost timber piece and permit the mat 5 to move further downwardly to a new position of the stop.

After each timber piece is picked upwardly by the projection members 10, they are moved by the associated transfer conveyor 8 so that the supporting surface 10b moves below the conveyor belt 9a and deposits each timber piece in succession on the second conveyor so that there is a predetermined spacing therebetween.

Because of the shape of the transferring or projection members 10, the back part of their slanting edge 10b in this case first rises above the level of the feeding conveyor 1 and, first of all, lifts up the back edge of the foremost piece of timber on the feeding conveyor. Before this, the pivoted arm 2 has been swung so that the stopping device 6 is lowered beneath the level of the feeding conveyor 1 to allow the mat of timber on the feeding conveyor 1 to proceed, for example, to slide forward. The foremost piece of timber 5 is unfastened from the second piece of timber 5'. The lifting of the foremost piece of timber from the feeding conveyor thus does not affect the other timber pieces on the feeding conveyor 1.

The projection member 10 passing or having passed the single feeding spot and having picked the foremost piece of timber 5 there, the cam 6 rises back into its upper position and stops the other pieces of timber.

The slanting upper surface or support surface 10b of the projection members 10 ensures that the timber pieces remain on the members and that they do not tend to glide off and, at the same time, it makes it possible to convey the timber pieces forward more slowly and securely with shorter distances between the members than in the previously known devices. For this reason, the upper surfaces 11 must have a sufficient declivity, e.g., approximately 45°, but they must not slant so much that the timber pieces would be turned upon them when being delivered to the second conveyor 9.

Naturally, the projection members 10 can also have a shape other than triangular, and the length of the upper edges 11 must be at least so big that the pieces of timber stay on the members, but not so big as to take up two pieces of timber at the same time. The latter condition is not unqualified, since the second piece of timber 5' can be prevented from getting onto the same support surface 10b with the foremost piece 5 by suitably synchronizing the cam 6 with the transferring conveyor 8.

While a specific embodiment of the invention has been shown and described in detail to illustrate the application of the principles of the invention, it will be understood that the invention may be embodied otherwise without departing from such principles.

What is claimed is:

1. An apparatus for feeding individual pieces of timber from a mat of a plurality of interconnected or closely adjacent timber pieces, comprising feed conveyor means for feeding the timber to a feed path, cam means engageable with the foremost edge of the foremost one of the timber pieces to arrest the mat temporarily in the feed path, a second conveyor for individual timber pieces spaced from said feed conveyor, and a transfer conveyor disposed between said feed conveyor and said second conveyor and including an endless member having a plurality of projection members thereon, each including a projection portion engageable in succession with the foremost one of the timber pieces adjacent the trailing edge thereof to facilitate the separation of the foremost piece from the mat, said projection members each having an inclined supporting surface extending forwardly from said projection portion in the direction of movement of said transfer conveyor and engageable beneath one respective foremost piece to support it in a position inclined downwardly in the direction of movement of said transfer conveyor, and drive means connected to said second conveyor, said transfer conveyor and said cam means, to move said second conveyor in a direction away from said transfer conveyor and to move said transfer conveyor in a direction away from said feed conveyor to said second conveyor and to actuate said cam means to move said cam means out of the way of the foremost piece of timber as it is picked up by said projection member and to move it back again to arrest the mat until the next projection member is moved into position to engage the foremost piece.

2. An apparatus, as claimed in claim 1, wherein said projection member comprises a triangular shaped member, said projection portion comprising the apex of the triangular member.

3. An apparatus, as claimed in claim 1, wherein said cam means comprises an oscillatable arm having a stop portion movable upwardly to block the foremost one of the timber pieces of said mat and being movable downwardly to release said mat for movement along said feed conveyor.

4. An apparatus, as claimed in claim 1, wherein said feeding conveyor comprises an inclined surface.

5. An apparatus, as claimed in claim 1, wherein said projection members are of triangular configuration and have an acute angle foremost, said supporting surface constituting the hypotenuse of the triangle and having a base portion extending substantially parallel to the direction of movement of the conveyor.

* * * * *